Aug. 11, 1925.
E. S. FRENCH
1,548,835
DEVICE FOR REMOVING BROKEN WOOD SCREWS
Filed Nov. 27, 1923
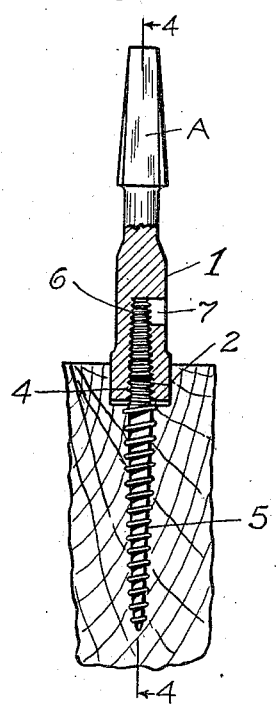
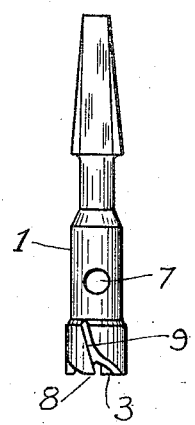
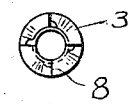
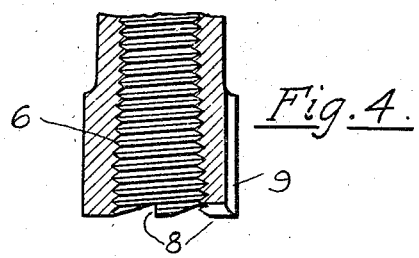
Inventor
Elsamer S. French
By H. S. Bailey, Attorney.

Patented Aug. 11, 1925.

1,548,835

UNITED STATES PATENT OFFICE.

ELSAMUR S. FRENCH, OF DENVER, COLORADO.

DEVICE FOR REMOVING BROKEN WOOD SCREWS.

Application filed November 27, 1923. Serial No. 677,331.

*To all whom it may concern:*

Be it known that I, ELSAMUR S. FRENCH, a citizen of the United States, residing at Denver, in the county of Denver and State of Colorado, have invented certain new and useful Improvements in a Device for Removing Broken Wood Screws, of which the following is a specification, reference being made to the accompanying drawing.

This invention relates to certain improvements in a bit specially designed for extracting wood-screws and the like that have been broken off in the material in which they were inserted.

The invention consists of a bit provided with an internal spiral cutting thread and external cutters.

The invention also consists of certain parts and details and combinations of the same, as will be hereinafter fully described and definitely claimed.

Reference is to be had to the accompanying drawing, forming a part of this specification, in which;

Fig. 1 is a sectional view, certain parts being shown in elevation;

Fig. 2 is a side elevation of my device as herein disclosed;

Fig. 3 is an end view of my device showing the cutting face of the bit proper;

Fig. 4 is an enlarged sectional view of the lower portion or cutting end of my device taken on the line 4—4 of Fig. 1; and Fig. 5 is a side elevation of the upper portion of a broken wood-screw shown also in Fig. 1 but more in entirety.

As disclosed in the accompanying drawing, A denotes the shank of a bit whereby the same is applied to a hand-brace. 1 denotes the body or cylindrical portion of my device, whereby certain new and useful improvements are set forth, and it is provided at its outer wood cutting end 3, which forms the face or cutting end of the bit proper, with an axially positioned inwardly extending tapering aperture 2, which is provided with a thread 6; 4 the upper portion of a broken wood-screw with new threads cut thereon by my device. 5 denotes the body portion of a wood-screw of the usual type, 6 the internal cutting threads which constitute a part of my invention, 7 a hole or exit for freeing the cuttings resulting from the operation of my device. 8 and 9 denote the spiral cutting edges of my device for the purpose of boring into the material in which the screws were inserted.

The device is used as follows: When a wood-screw is broken off in a piece of wood or the like, I attach the shank end of my bit to the chuck of a hand-brace in the usual manner, and then apply the tapered threaded end of my screw extractor to the screw itself, first by counter-boring in the wood, and then cutting a new thread, usually a left-hand or opposite thread from that of the screw itself, thus permitting the operator to extract the left-over portion by backing out the same in a reverse motion from the material in which it was inserted.

It will be noted that the new threads on the broken-off screw are of such a length as will permit the easy removal of said screw and are tapered, thereby forming a distinct feature of my invention.

When the operator wishes to probe into a hole for a broken-off screw, he simply bores into the wood until the end of the bit strikes the upper portion of the screw.

When my device is correctly centered, the new threads are cut of an opposite hand to those of the screw proper which permits the easy removal of said screw.

When the screw is broken off near the surface of the material in which it is inserted, very little counter-boring will be required as the bit will easily center itself prior to cutting the threads of the broken-off screw.

Having thus described my invention, what I claim as new and desire to protect by Letters Patent is—

1. A bit for extracting broken wood-screws, provided with tapered internal spiral cutting threads and an external end cutter in combination therewith, as shown and described.

2. The combination with a shank fixedly secured to a bit comprising a cylinder having internal cutting threads, external face cutters, and means of exit for cuttings, as shown and described.

In testimony whereof I hereunto affix my signature.

ELSAMUR S. FRENCH.